United States Patent
Thyssen

[19]

[11] Patent Number: 6,062,636
[45] Date of Patent: May 16, 2000

[54] OPEN ROOF CONSTRUCTION FOR A VEHICLE

[75] Inventor: Edwin Johannes Richardus Wilhelmus Thyssen, Haps, Netherlands

[73] Assignee: Inalfa Industries B.V., Venray, Netherlands

[21] Appl. No.: 09/236,861

[22] Filed: Jan. 25, 1999

[51] Int. Cl.[7] .................... B60J 7/00; B60J 7/043
[52] U.S. Cl. ...................... 296/213; 296/216.06
[58] Field of Search .................... 296/213, 214, 296/216.06

[56] References Cited

U.S. PATENT DOCUMENTS

| | | | |
|---|---|---|---|
| 4,332,416 | 6/1982 | Lutz et al. | 296/213 |
| 4,664,439 | 5/1987 | Schaetzler et al. | 296/213 |
| 4,671,565 | 6/1987 | Grimm et al. | 296/216.04 |
| 4,676,546 | 6/1987 | Igel | 296/217 |
| 4,883,311 | 11/1989 | Kohlpaintner et al. | 296/213 |
| 5,375,904 | 12/1994 | Huyer | 296/213 |
| 5,664,827 | 9/1997 | Mori et al. | 296/213 |

*Primary Examiner*—D. Glenn Dayoan
*Assistant Examiner*—Patricia Engle
*Attorney, Agent, or Firm*—Westman, Champlin & Kelly, P.A.; S. Koehler

[57] ABSTRACT

An open roof construction for a vehicle having a fixed roof, in which an opening is provided, comprises guide rails to be mounted near the lateral edges of the roof opening. Slides which comprise displacement mechanisms for movably supporting a closing element for selectively closing or releasing the roof opening are guided in the guide rails. A water catching device includes a transversely extending, movable water drain are supported at the ends thereof by the slides and they are attached to the slides by a snap connection. The snap connection springs in a direction transversely to the guide rails, preferably in that the water drain and the slide abut against each other with a spring element, seen in the longitudinal direction of the guide rails.

8 Claims, 2 Drawing Sheets

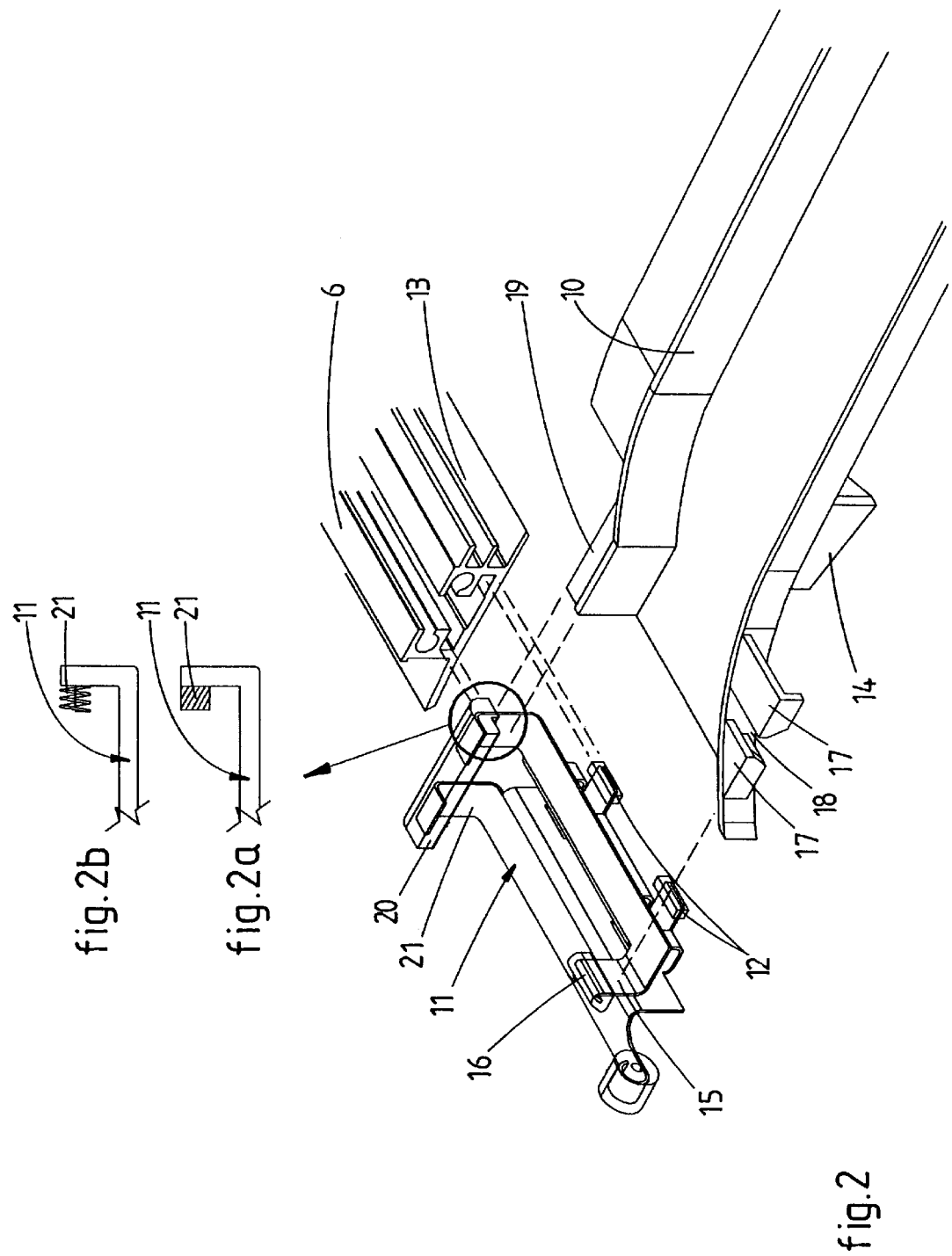

OPEN ROOF CONSTRUCTION FOR A VEHICLE

FIELD OF INVENTION

The invention relates to an open roof construction for a vehicle having a fixed roof, in which an opening is provided, which construction comprises guide rails to be mounted near the lateral edges of the roof opening, slides which are guided in said guide rails, which slides comprise displacement mechanisms for movably supporting a closing element for selectively closing or releasing said roof opening, and water catching means comprising a transversely extending, movable water drain, which is supported by the slides at its ends and which is attached to said slides by means of a snap connection.

DESCRIPTION OF RELATED ART

In a prior art embodiment of an open roof construction, the water drain is attached to the two slides by means of a screwed connection. As a result of this, the connection between the water drain and the slides is rigid. Due to the lack of any flexibility in the connection between the water drain and the slides, deviations in the parallelism of the guide rails can only be absorbed by the displacement mechanisms, which interferes with their smooth movement.

On the other hand, open roof constructions are known wherein the water drain and the slides are attached to each other by means of a snap connection, which springs in the longitudinal direction of the guide rails. However, since all large forces which are exerted on the displacement mechanisms and on the water drain take place in the longitudinal direction of the guide rails, the snap connection may come loose. For safety's sake an additional screw is needed, therefore, in order to provide a reliable connection. This in turn makes the connection rigid again, with the above-described consequence.

BRIEF SUMMARY OF THE INVENTION

The object of the invention is to provide an open roof construction, wherein the above-described problem has been eliminated in a simple yet efficient manner.

In order to accomplish that object, the open roof construction according to the invention is characterized in that the snap connection springs in a direction transversely to the guide rails.

By turning the snap connection through at least approximately 90°, forces being exerted in the longitudinal direction of the guide rails no longer affect the snap connection, so that said forces can no longer cause it to come loose. This simple measure therefore enhances the reliability of the connection, without requiring the use of a screw or other fastening element, which would make the connection rigid. Particularly when the snap connection springs in transverse direction, said snap connection is capable of absorbing any deviations in the parallelism of the guide rails without any problem, as a result of which the slides and the displacement mechanisms will move more smoothly. This leads to a decreased noise level, which, together with the smooth movement, leads to an enhanced sense of quality of the entire open roof.

Especially in an embodiment wherein a sun screen is mounted under the closing element, which sun screen is guided in the guide rails with its edges and which is stopped by the water drain in its rearmost position, it is advantageous that the water drain and the slide abut against each other with a spring element in the longitudinal direction of the guide rails.

In this embodiment, wherein the sun screen can exert large forces on the water drain, said spring element is capable of absorbing said forces, as a result of which said forces will not be transmitted to the displacement mechanisms, so that said displacement mechanisms will be loaded less heavily. Furthermore, the snap connections and the spring elements together bias the connection between the water drain and the slides, as a result of which rattling is prevented in an effective manner and tolerances are absorbed. The spring elements may for example consist of a springing portion of the slide itself, or of a spring or a rubber-like buffer element.

In a preferred embodiment of the open roof construction according to the invention, the water drain is provided with a transversely extending edge, preferably a horizontal rear edge, which abuts in backward direction against the spring element and which hooks in vertical direction under a flange of the slide in question, whereby it is preferred to snap the water drain in downward direction onto the slides.

This enables very simple mounting and demounting, so that a saving in labour can be achieved during mounting and subsequent maintenance.

BRIEF DESCRIPTION OF THE DRAWINGS

The invention will be explained in more detail hereafter with reference to the drawings, which show an embodiment of the open roof construction according to the invention.

FIG. 2 is an exploded view of the connection between one end of a water drain and a slide.

FIGS. 2A and 2B show alternatives for details of FIG. 2.

DETAILED DESCRIPTION OF THE INVENTION

Figure 1:
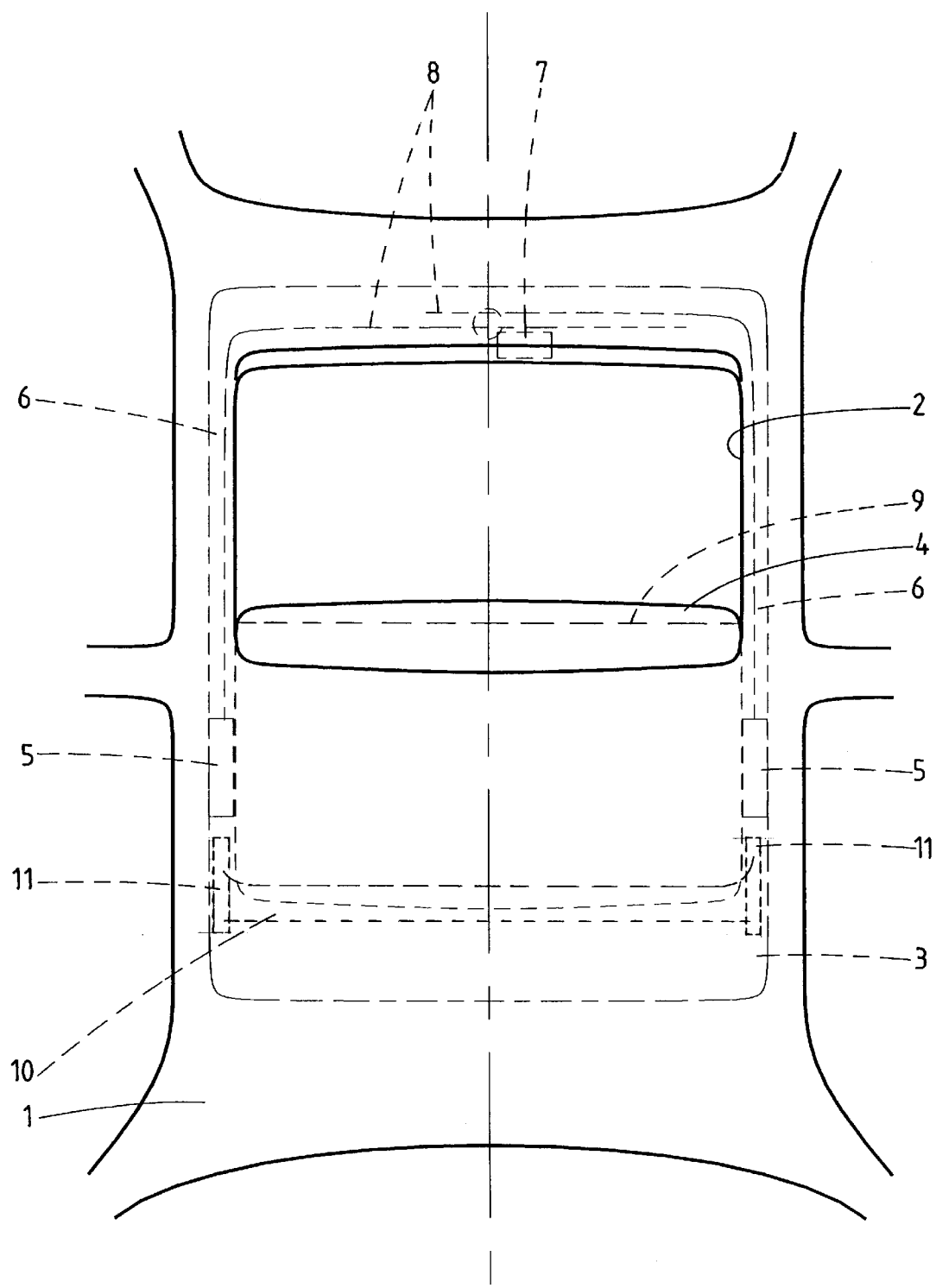
FIG. 1 is a very schematic plan view of a vehicle roof fitted with the embodiment of the open roof construction according to the invention.

FIG. 1 shows the fixed roof 1 of a motor vehicle, in this case a passenger car. Said fixed roof 1 is provided with a roof opening 2 of at least approximately rectangular shape for mounting an open roof construction therein. The open roof construction comprises a stationary frame 3, which is mounted against the underside of the fixed roof 1 of the vehicle in this case.

In the illustrated embodiment, the open roof construction is a so-called sliding roof or a tilt-sliding roof which is provided with a more or less rigid, in this case, and preferably transparent panel 4 as the closing element, which can selectively open the roof opening 2 or release it to a smaller or larger degree. To this end, panel 4 is laterally supported by displacement mechanisms 5, which are slidably accommodated in guide rails 6 which are mounted on frame 3 or which form part thereof, and which extend in longitudinal direction on either side of roof opening 2 and rearwards thereof, parallel to each other. Said displacement mechanisms 5 can be moved synchronously in guide rails 6, thus moving the panel not only in longitudinal direction, but also in vertical direction. To this end, the displacement mechanisms are operated from a driving device 7, such as an electric motor, for example via pull-push cables.

Besides panel 4, the open roof construction also comprises a second closing element in the form of a sun screen 9, which is movably guided in guide rails 6 with its side edges. Sun screen 9 can be moved forwards or backwards by hand or be taken along by panel 4.

The open roof construction comprises water catching means for catching any water that trickles through between panel 4 and roof opening 2, of which water catching means a transversely extending, movable water drain 10 is shown in the drawing. The water drain is positioned under the rear edge of roof opening 2 in the closed position of panel 4, and when panel 4 moves backwards, the water drain will move along with it. To this end, water drain 10 is mounted with its ends on rear slides 11 of displacement mechanisms 5.

This connection between water drain 10 and one of the slides 11 is shown in more detail in FIG. 2. The figure shows the rear slide 11, which moves via sliding shoes 12 in a groove of the guide rail 6, which is represented as an extruded section. An inwardly directed groove 13 of guide rail 6 is intended to receive the lateral edge of sun screen 9 (not shown). The movement of sun screen 9 in backward direction is limited by water drain 10, which is to that end provided with a stop 14.

According to the invention, the water drain 10 is mounted on the associated slide 11 at each end by means of a hook and snap connection. The snap connection comprises an upwardly extending lip 15 which is mounted on slide 11 and which springs in a direction transversely to the guide rail 6, which lip is provided at the upper end with a hook-shaped element 16, which points outwards in this case. The snap connection furthermore comprises a flange 17 provided near the end of water drain 10, at the front side thereof, which comprises a slot-shaped passage 18 for hook-shaped element 16, through which the hook-shaped element fits after bending of the resilient lip 15, so that the hook-shaped element 16 can hook onto the outer part of flange 17 under pretension.

The hook connection between water drain 10 and rear slide 11 is present at the rear side of water drain 10 and slide 11, and it comprises a horizontal rear edge 19 on the water drain, which is capable of engaging under a horizontal, forwardly extending flange 20 of slide 11, and which can also abut in backward direction against a spring element 21. In the present case, the spring action is provided by the slide itself, which is made of spring steel, and whose upwardly extending rear side springs. Flange 20 and hook-shaped element 16 can be formed on steel slide by means of an injection molding process, for example. Alternatively, slide 11 itself may be made of a rigid material, such as zamak or a plastic material, whilst spring element 21 is a rubber-like buffer element or a spring, for example, as is shown in FIGS. 2A and 2B. The rear wall of slide 11 itself need not be resilient in that case.

The mounting of water drain 10 on the two slides is very simple. First, water drain 10 is hooked with edges 19 under flange 20 of the two slides present in guide rails 6 in a sloping position of water drain 10, after which the front side of water drain 10 can be pressed down, as a result of which the snap connection is automatically effected, because hook-shaped element 16 is pressed through slot 18, whereupon it engages flange 17 of water drain 10, thus completing the connection. Since resilient lip 15 of the snap connection springs in transverse direction, any deviations in the parallelism of the guide rails 6 can easily be absorbed. On the other hand, the forces which are exerted on water drain 10 in backward direction, for example when sun screen 9 is moved hard against its stop, are absorbed by spring element 21 of the slide, as a result of which said forces are transmitted in attenuated form to the displacement mechanisms 5 which are connected to slides 11. The snap connection is not loaded thereby.

From the foregoing it will be apparent that the invention provides a very simple yet efficient connection between the water drain and the supporting slides, which has a favorable effect on the overall operation of the open roof construction.

The invention is not limited to the embodiment as illustrated in the drawing and described in the foregoing, which can be varied in several ways within the scope of the invention.

I claim:

1. An open roof construction for a vehicle having a fixed roof, in which an opening is provided, which construction comprises:

guide rails to be mounted near the lateral edges of the roof opening, slides which are guided in said guide rails, said slides comprising displacement mechanisms for movably supporting a closing element for selectively closing or releasing said roof opening, water catching means comprising a transversely extending movable water drain, which is supported by said slides at its ends and which is attached to said slides by means of a snap connection, wherein said snap connection springs in a direction transversely to said guide rails.

2. An open roof construction according to claim 1, wherein said water drain and said slide abut against each other with a spring element, seen in longitudinal direction of said guide rails.

3. An open roof construction according to claim 2, wherein said spring element consists one of a springing portion of said slide, a spring, and a rubber-like buffer element.

4. An open roof construction according to claim 2, wherein said water drain is provided with a transversely extending edge, which abuts in backward direction against the spring element and which hooks in vertical direction under a flange of the slide in question.

5. An open roof construction according to claim 1, wherein said water drain has been snapped onto said slides in downward direction.

6. An open roof construction according to claim 1, wherein each snap connection is provided with a resilient lip comprising a hook-shaped element, which is mounted on the respective slide, whilst the water drain is provided at its respective end with a flange, behind which said hook-shaped element can engage.

7. An open roof construction according to claim 1, wherein said snap connections are formed on the front side of said water drain.

8. An open roof construction according to claim 1, wherein said closing element is an at least partially transparent panel, in particular a transparent rigid panel, which is provided with a sun screen, which is movably guided in said guide rails with its side edges, and wherein the movement in backward direction is limited by said water drain, which is to that end provided with a stop.

* * * * *